US011299916B2

United States Patent
Hentschel et al.

(10) Patent No.: US 11,299,916 B2
(45) Date of Patent: Apr. 12, 2022

(54) LOCK

(71) Applicant: ABUS August Bremicker Söhne KG, Wetter-Volmarstein (DE)

(72) Inventors: Andreas Hentschel, Selters (DE); Andreas Kipping, Selbach (DE)

(73) Assignee: ABUS AUGUST BREMICKER SÖHNE KG, Wetter-Volmarstein (DE)

( * ) Notice: Subject to any disclaimer, the term of this patent is extended or adjusted under 35 U.S.C. 154(b) by 330 days.

(21) Appl. No.: 16/552,562

(22) Filed: Aug. 27, 2019

(65) Prior Publication Data

US 2020/0071966 A1    Mar. 5, 2020

(30) Foreign Application Priority Data

Aug. 30, 2018 (DE) .......................... 102018121248.8

(51) Int. Cl.
*E05B 71/00* (2006.01)
*E05B 47/00* (2006.01)
(Continued)

(52) U.S. Cl.
CPC .......... *E05B 71/00* (2013.01); *E05B 47/0012* (2013.01); *E05B 55/00* (2013.01);
(Continued)

(58) Field of Classification Search
CPC ...... E05B 71/00; E05B 47/0012; E05B 55/00; E05B 2015/0424; E05B 2015/0496;
(Continued)

(56) References Cited

U.S. PATENT DOCUMENTS 131,237 A * 9/1872 Wallin
587,609 A * 8/1897 Roland
(Continued)

FOREIGN PATENT DOCUMENTS

CN      2861417 Y    1/2007
CN      1924271 A    3/2007
(Continued)

OTHER PUBLICATIONS

EP Search Report; Appl. No. 19191832.5; dated Dec. 13, 2019; 3 pages.

*Primary Examiner* — Lloyd A Gall
(74) *Attorney, Agent, or Firm* — Dickinson Wright PLLC

(57) ABSTRACT

A lock, in particular for a two-wheeler, comprises: a lock body; a hoop that is movable between an open position and a closed position; a latch that is movably supported at the lock body between a locked position in which it blocks the hoop in its closed position against a departure from the closed position and an unlocked position in which it releases the hoop; a sensor for detecting the latch position; and a movably supported lever. A coupling section of the lever is movement-coupled to the latch here. In addition, the lever is supported such that on a movement of the coupling section, a deflection section spaced apart from the coupling section carries out a movement that is greater in comparison therewith, with the sensor detecting the position of the deflection section of the lever to detect the latch position.

21 Claims, 3 Drawing Sheets

(51) Int. Cl.
*E05B 55/00* (2006.01)
*B62H 5/14* (2006.01)
*E05B 15/04* (2006.01)

(52) U.S. Cl.
CPC .............. *E05B 2015/0424* (2013.01); *E05B 2015/0496* (2013.01)

(58) Field of Classification Search
CPC ......... E05B 47/0038; E05B 2047/0069; E05B 47/0005; E05B 41/00; E05B 67/28; B62H 5/147
USPC ......... 70/40, 48, 53, 432, 276, 278.7, 279.1, 70/280–282, 233–235, 225–228
See application file for complete search history.

(56) References Cited

U.S. PATENT DOCUMENTS

| | | | | |
|---|---|---|---|---|
| 936,863 | A | * | 10/1909 | Byrne |
| 1,412,600 | A | * | 4/1922 | Baumstark .............. E05B 67/28 70/40 |
| 1,922,897 | A | * | 8/1933 | Jagdish .................. E05B 67/28 70/40 |
| 2,647,390 | A | * | 8/1953 | Paulson ................. B62H 5/147 70/227 |
| 3,965,709 | A | * | 6/1976 | Belke ..................... B62H 5/003 70/227 |
| 5,444,999 | A | * | 8/1995 | Hsiao .................... B60R 25/066 70/202 |
| 6,363,763 | B1 | * | 4/2002 | Geringer ................ E05B 45/12 70/432 |
| 2009/0090148 | A1 | * | 4/2009 | Kollin ................... E05B 45/083 70/263 |
| 2011/0162416 | A1 | | 7/2011 | Becker |
| 2020/0023917 | A1 | * | 1/2020 | Hu ........................ B62H 5/003 |
| 2020/0070912 | A1 | * | 3/2020 | Muller ................. E05B 45/005 |

FOREIGN PATENT DOCUMENTS

| | | |
|---|---|---|
| CN | 201100043 Y | 8/2008 |
| CN | 205591695 U | 9/2016 |
| CN | 107120002 A | 9/2017 |
| CN | 206874081 U | 1/2018 |
| CN | 107687297 A | 2/2018 |
| CN | 107747435 A | 3/2018 |
| CN | 207160795 U | 3/2018 |
| DE | 3912900 A1 * | 11/1989 |
| DE | 102005041268 A1 | 3/2007 |
| DE | 102008020950 A1 | 10/2009 |
| DE | 102010000553 A | 8/2011 |
| EP | 1834864 A1 | 9/2007 |
| JP | 3865140 B2 | 1/2007 |
| KR | 20110075748 A | 7/2011 |
| KR | 101110416 B1 | 2/2012 |

* cited by examiner

LOCK

CROSS-REFERENCES TO RELATED APPLICATIONS

This application claims the benefit and priority of German Patent Application Serial No. 102018121248.8 filed Aug. 30, 2018, the entire disclosure of which is incorporated herein by reference.

FIELD

The present lock relates to a lock, in particular for a two-wheeler, having a lock body, a hoop that is movable, in particular supported, or at least guided, between an open position and a closed position, and a latch that is movably supported at the lock body between a locked position in which it blocks the hoop, while being in its closed position, against a departure from the closed position, and an unlocked position in which it releases the hoop. The lock can in particular be a frame lock. In its closed position, the hoop, for example, serves to secure an object by means of the lock, e.g. to connect it to another object or to block a movement of the object, for instance in the manner of a spoke lock that prevents the rotation of a wheel. The latch, in contrast, typically does not cooperate with objects outside the lock, but rather with the hoop and serves to block or release the hoop, in particular in its closed position, depending on whether the lock is locked or unlocked.

Such a lock can be configured as semi-automatic or fully automatic to improve comfort, in that is it at least partly drivable by a motor. This means that individual elements of the lock can be moved in a motorized manner by one or more drive motors of the lock. As a rule, such a lock can at least be unlocked in a motorized manner, i.e. the latch is displaceable in a motorized manner from the locked position into the unlocked position to release the hoop for a departure from its closed position. The latch can, however, additionally or alternatively, also be displaceable in a motorized manner in the opposite direction. Provision can additionally be made that the hoop can (also) be moved in a motorized manner.

To be able to reliably move the element of the lock that is drivable in a motorized manner, it is expedient to be able to detect information on the respective current position of the element. A sensor can, for example, be provided for this purpose. Such a sensor is in particular used to detect the latch position. If the latch can only adopt certain positions such as the locked position when the hoop is in a specific position, e.g. in the closed position, the position of the hoop can also be indirectly detectable by means of the sensor detecting the latch position.

To be able to determine with reference to the sensor whether the hoop is locked or released, the sensor must be able to reliably distinguish between the locked position and the unlocked position of the latch. In the endeavor to configure the lock in as compact a manner as possible, however, the stroke of the latch, i.e. the length of the distance, as a rule of the linear distance, to be covered between the locked position and the unlocked position can be very small so that the locked position and the unlocked position cannot be distinguished or cannot be reliably distinguished from one another.

The latch must furthermore be able to cooperate with the hoop to block the hoop. The latch is therefore as a rule arranged in direct proximity to the hoop, with dirt also being able to penetrate from the outside into the region of the latch from the hoop that cooperates with objects outside the lock. Such contaminants can additionally disrupt the detection of the latch position and thus make it more difficult.

SUMMARY

It is an object of the invention to provide a lock that is in particular at least partly drivable in a motorized manner in which the positions of moving elements of the lock, in particular the respective position of the latch and advantageously also, at least indirectly, the position of the hoop can be detected particularly reliably.

In accordance with the invention, the lock comprises a movably supported lever, with a coupling section of the hoop being movement-coupled to the latch, with the lever being supported such that, on a movement of the coupling section, a deflection section of the lever spaced apart from the coupling section carries out a movement that is larger in comparison with the movement of the coupling section, and with the sensor detecting the position of the deflection section to detect the latch position.

The lever therefore, on the one hand, has a coupling section and, on the other hand, a deflection section that are arranged separately from one another. The lever is here movement-coupled to the latch via the coupling section, that is it is in particular coupled such that a movement of the latch results in a corresponding movement of the coupling section and/or vice versa. The movements can here in particular be in accordance with one another to the extent that the latch and the coupling section of the lever at least substantially move by the same amount. The latch and the coupling section of the lever can, however, here also be coupled such that a linear movement of the latch results in a rotational movement or pivot movement of the lever and/or vice versa. The coupling section thus does not necessarily have to carry out exactly the same movement as the latch. However, there is preferably at least an unambiguous relationship between the respective position of the latch and the respective position of the coupling section due to the movement coupling. The coupling section of the lever and the latch furthermore preferably cooperate directly with one another, e.g. by a direct engagement into one another.

The deflection section of the lever is formed by that section of the lever whose position is detected by the sensor in particular directly. The sensor preferably cooperates directly with the deflection section of the lever for this purpose. The position of the latch is in contrast only indirectly detected in this manner.

On a movement of the lever that is preferably configured at least substantially as rigid, not only the coupling section, but also the deflection section of the lever move due to the kind of support of the lever. The amount of the movement of the deflection section is here, however, not identical with the amount of the movement of the coupling section. A kind of translation rather takes place that results from the arrangement of the coupling section and of the deflection section relative to one another in connection with the kind of support of the lever. The movement of the deflection section that it carries out when the coupling section moves is here larger than the simultaneous movement of the coupling section. To this extent, the movement of the latch by the lever is therefore not only transmitted from the coupling section to the deflection section, but is also amplified in this process.

Both the transmission of the movement and the amplification here contribute to an improvement of the reliability of the detection of the latch position. For, on the one hand, the detection can thus take place in a region that can be outside the so-called contamination region of the latch and can thus be better protected against contamination. The sensor can in particular thereby be positioned more flexibly within the lock, for example together with other sensitive electronic components in a particularly protected region of the lock. On the other hand, the different positions of the can be distinguished more reliably as a result of the amplification. While the total stroke of the latch can amount to a few millimeters, preferably less than 5 mm, e.g. approximately 4 mm or less, provision can be made that the corresponding stroke of the deflection section amounts to at least one and a half times, preferably at least double, that of the latch stroke. Since there is ideally an unambiguous relationship between the position of the latch and the position of the deflection section (apart from a clearance that is as small as possible) via the lever and the movement coupling of the lever to the latch, the positions of the deflection section that correspond to the unlocked position or to the locked position of the latch are further apart than said latch positions due to the increased movement. The cooperation of the sensor with the deflection section can therefore differ more in these two positions and can thus result in a more reliable detection than if the sensor were to cooperate directly with the latch.

The lever can, for example, be pivotably supported about a pivot point. The amplification between the coupling section and the deflection section then results directly from the ratio of the respective spacings of the two sections from the pivot point. In addition, the amplification is constant with such a pivotable support. In general, however, other kinds of support can also be considered, also including those in which the amplification varies. Deviations from an exactly constant amplification can also result from the kind of movement coupling of the coupling section of the lever to the latch, e.g. when the movement of the latch is linear while the coupling section of a pivotable lever runs through a partial circle path.

The pivot point can in particular be provided between the coupling section and the deflection section. This enables a comparatively simple support of the lever and a coupling of the latch to the lever. In general, the coupling section and the deflection section can, however, also be arranged at the same side of the pivot point. In this manner, comparatively large amplifications of the respective amount of the movement between the coupling section and the deflection section can be achieved with a comparatively short lever, which makes particularly compact embodiments possible.

The lever can, for example, be at least substantially bar-shaped. The coupling section, the deflection section, and the pivot point can in particular in this case be on a straight line that can correspond to the longitudinal extent of the lever. The coupling section can furthermore be provided at a first end of the lever and the deflection section can be provided at a second end of the lever opposite the first end. The ends of the lever are in particular ends with respect to said longitudinal extent of the lever.

In accordance with an advantageous embodiment, the hoop is at least partly arranged within the lock body, with the latch and the lever being arranged completely within the lock body. For while the hoop has to cooperate with objects outside the lock, it is in particular advantageous with respect to the security of the lock if the latch and the lever are not accessible from the outside. The lever here makes possible a flexible positioning of the sensor that is likewise advantageously arranged in the lock, and is not accessible from the outside, and is not restricted to an arrangement in the proximity of the latch due to the lever. Due to these arrangement of the lever and/or of the sensor, the position detection can take place outside the contamination region of the latch and in particular also in an encapsulated region of the lock body, or a region of the lock body particularly secured in a different manner.

It is furthermore preferred that the deflection section magnetically cooperates with the sensor. In this manner, the detection of the position of the deflection section by means of the sensor can advantageously take place contactlessly. This makes it possible to arrange the sensor, and equally further electronics of the lock, spatially isolated with respect to mechanical elements such as in particular the lever and the latch.

The sensor can, for example, be configured as a magnetic sensor that cooperates with a permanent magnet that the deflection section has. The deflection section can in particular be at least substantially defined by the permanent magnet. The sensor can generally, for example, be configured as a simple magnetic switch. The sensor is, however, preferably configured as a Hall sensor or as a magnetic field sensor. It is particularly advantageous here if the sensor is configured for a three-dimensional magnetic detection. This means, for example, that it is possible to determine the position of a permanent magnet in space by means of the sensor or that not only the strength of a magnetic field, but also its spatial orientation can be determined by means of the sensor. In this manner, more than two states can also be distinguished by means of a single sensor and whole movement paths can be reproduced under certain circumstances.

The magnetic cooperation of the deflection section with the sensor further makes an embodiment possible in which the lock comprises an inner housing, preferably an inner housing closed fully around its periphery, arranged within the lock body, with the sensor being arranged within the inner housing and the lever being arranged outside the inner housing. The deflection section and the sensor here therefore magnetically cooperate through the inner housing. In this manner, the sensor can optionally be encapsulated with other electronics and/or other components of the lock to be especially protected by the inner housing with respect to the other components of the lock. The inner housing is here advantageously not magnetic and is preferably configured as reinforced with respect to an outer housing the lock, e.g. is formed from a hardened material, in particular from a hardened metal.

In accordance with a further advantageous embodiment, the lever is supported such that it has a single degree of freedom. This is in particular expedient when the latch also only has one degree of freedom. If only one degree of freedom is present, the lever can only be moved along a defined movement path; however, in two opposite directions. Measured values detected by the sensor can in particular be distinguished by a movability restricted in this manner especially with respect to whether they can be associated with a possible position of the deflection section, i.e. in particular with a position along the defined movement path of the deflection section. If an association is not possible, the detected measured value can have to be evaluated as an indication of a manipulation attempt at the lock in which the lever is moved away from its usual movement path or in which an attempt is made to influence the lock by means of external magnetic fields. In connection with such a detection of manipulation attempts, said sensors configured for a three-dimensional magnetic detection are in particular advantageous since they provide more differentiated information than magnetic sensors that only detect the spacing of a magnet from the sensor or only the absolute amount of the strength of a magnetic field.

In accordance with a further advantageous embodiment, the lock comprises a drive motor for moving the latch. The drive motor can additionally also be provided to move the hoop. The lock can also have one or more further drive motors, in addition to said drive motor, to move the hoop and/or further movable elements of the lock.

If a drive motor for moving the latch is provided in the lock, the lever is preferably aligned substantially in parallel with the drive motor. A longitudinal extent of the lever, e.g. a connection line between the coupling section and the deflection section of the lever, is here in particular arranged in parallel with an axis of rotation of a drive shaft of the drive motor and/or with a longitudinal extent of the drive motor. The lever can in particular adopt at least one position as part of its movability that corresponds to a position of the latch on its movement path between the locked position and the unlocked position and in which the lever is aligned in parallel with the drive motor.

The coupling section of the lever is here preferably arranged in the region of a drive shaft of the drive motor and the deflection section of the lever is arranged in the region of electrical connections of the drive motor. For in this manner, the output shaft of the drive motor or a transmission element connecting the output shaft to the latch in a drive-effective manner and the coupling section of the lever can cooperate with the latch, on the one hand, and the connections of the drive motor and the deflection section of the lever can cooperate with the sensor or with other electronic components, e.g. with an evaluation and control unit that is also connected to the sensor, on the other hand, without any greater spatial distances having to be overcome.

In accordance with a further advantageous embodiment, the hoop has a first engagement recess into which the latch can engage when the hoop is in the closed position to block the hoop against a departure from the closed position. The hoop furthermore preferably has a second engagement recess into which the latch can engage when the hoop is in the open position to block the hoop against a departure from the open position. In such an embodiment, the open position can therefore also be secured by the hoop in addition to the closed position. This is, for example, advantageous with automatic frame locks in which it is important to ensure that the hoop does not close accidentally, above all not during a ride. The position the latch adopts when it completely engages into the first engagement recess of the hoop in particular corresponds to said locked position. The position the latch adopts when it completely engages into the second engagement recess of the hoop can likewise correspond to said locked position. It is, however, preferably a position that differs both from the locked position and from the unlocked position of the latch and that represents a securing position of the latch.

In accordance with a further advantageous embodiment, the latch is preloaded against the hoop so that it contacts a contour of the hoop at least for as long as it is not moved or held against the preload, e.g. by a drive motor of the lock. On a movement of the hoop, the latch can here slide along the contour, at least along regions of the contour that do not have any step-like jumps. The contour of the hoop is configured here such that, as a consequence of the preload, the latch adopts its locked position in the closed position of the hoop, adopts its unlocked position in positions of the hoop that are between the closed position and the open position of the hoop, and adopts a securing position differing from the locked position and the unlocked position in the open position of the hoop. This securing position can in particular be the above-named securing position. The securing position is preferably disposed along the movability of the latch between its locked position and its unlocked position.

Provision can furthermore be made in such an embodiment that the contour of the hoop has said first engagement recess and said second engagement recess so that the latch engages into the first engagement recess as a consequence of the preload in the closed position of the hoop, with the locked position of the latch being defined by the depth of the engagement, and engages into the second engagement recess in the open position of the hoop, with the securing position of the latch being defined by the depth of the engagement.

The movement of the deflection section of the lever cooperating with the sensor amplified with respect to the movement of the latch is in particular advantageous in such embodiments in which a securing position of the latch is defined in addition to the locked position and the unlocked position of the latch and at least three different positions are to be distinguished. For the more latch positions that have to be distinguished, the more difficult their differentiation is, in particular with a latch having a small overall stroke. Since the latch position is not directly detected, but rather with reference to the position of the deflection section of the lever movement-coupled to the latch, more than two positions of the latch can, however, also be reliably distinguished.

Embodiments of the above-described kind in which the latch is preloaded against a contour of the hoop, additionally make it possible to also determine the position of the hoop with reference to the detected latch position (over the deflection section of the lever). For due to the preload, as long as the latch is not moved or held against the preload, the position of the latch is determined by the position of the contour of the hoop the latch just contacts, which in turn depends on the position of the hoop. The contour can here in particular have three different levels that thus result in a corresponding number of latch positions and are arranged such that the latch contacts the contour in the closed position of the hoop at the height of a first level that can in particular correspond to said first engagement recess and thereby adopts its locked position; contacts the contour in the open position of the hoop at the height of a second level that can in particular correspond to said second engagement recess and thereby adopts its securing position; and contacts the contour at the height of a third level in positions of the hoop between the closed position and the open position. The position of the latch corresponding to this third level can then be evaluated as an indication that the hoop is just somewhere between the closed position and the open position and is in particular just moving, particularly since the latch advantageously does not block the hoop in this position. To this extent, this latch position corresponds to the unlocked position of the latch. The unlocked position here does not necessarily have to be fixed to a single latch position, but can rather also comprise a range of latch positions, namely in particular all those positions in which the hoop is released for a movement out of the closed position into the open position and/or vice versa. An (or each) position in which the latch is adjusted in a motorized manner against the preload by so much that it is displaced beyond the uppermost level of the contour of the hoop and thus necessarily releases the hoop can to this extent in particular also correspond to the unlocked position of the latch.

DRAWINGS

The invention will be described in the following by way of example with reference to the Figures.

Figure 2:
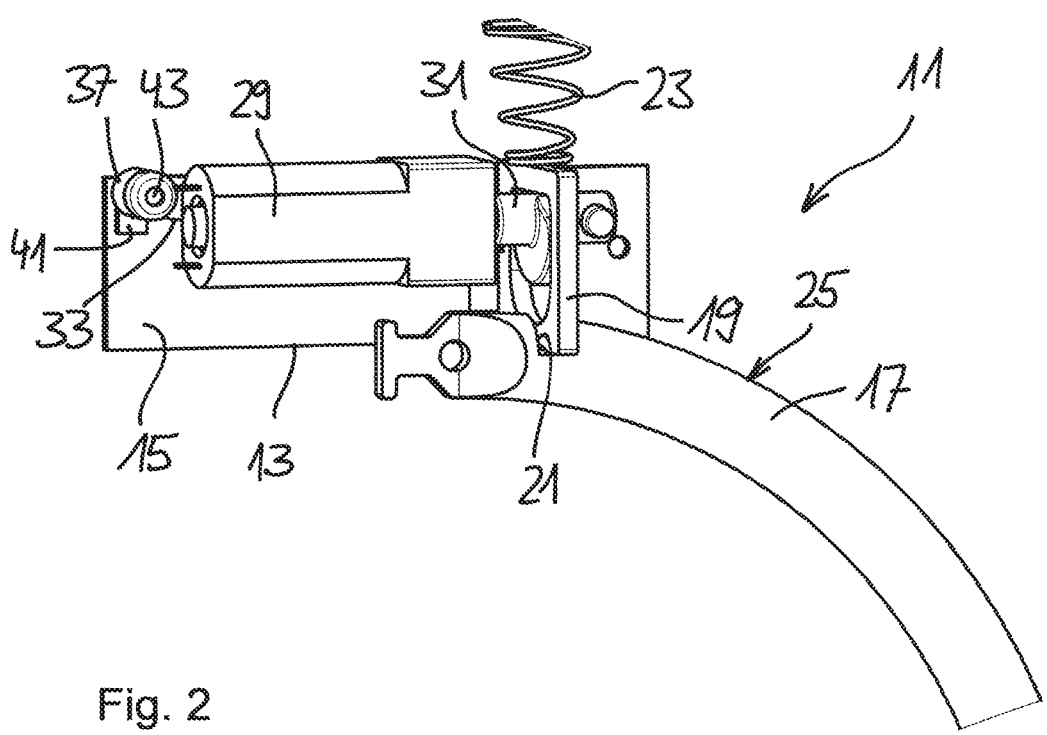
FIG. 2 shows the same embodiment with the same positions as in FIG. 1, but from a different angle of view.
Figure 3:
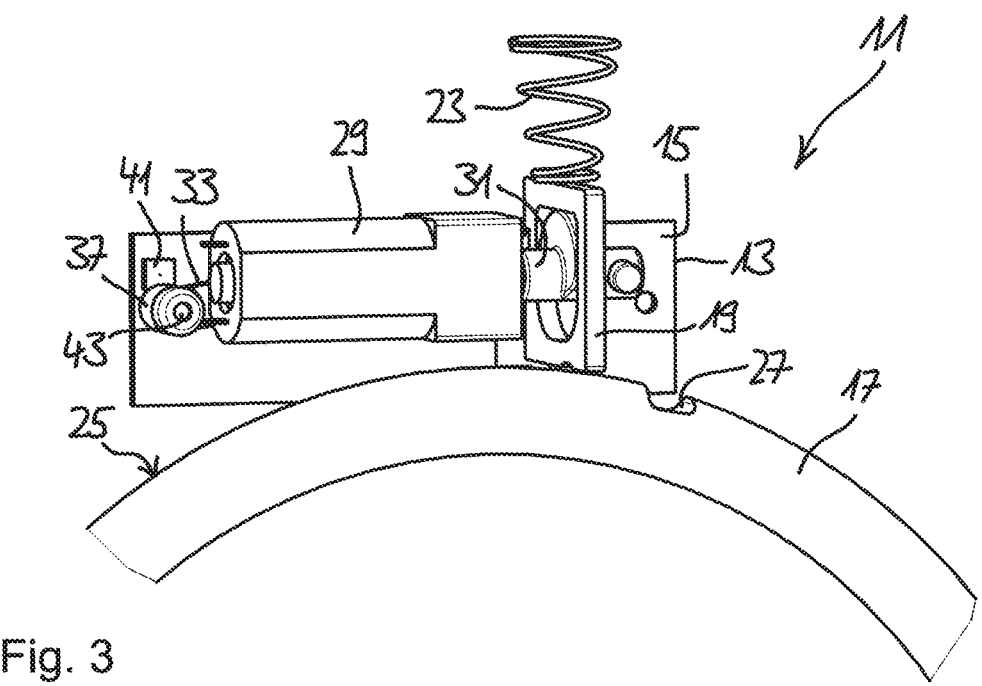
Figure 4:
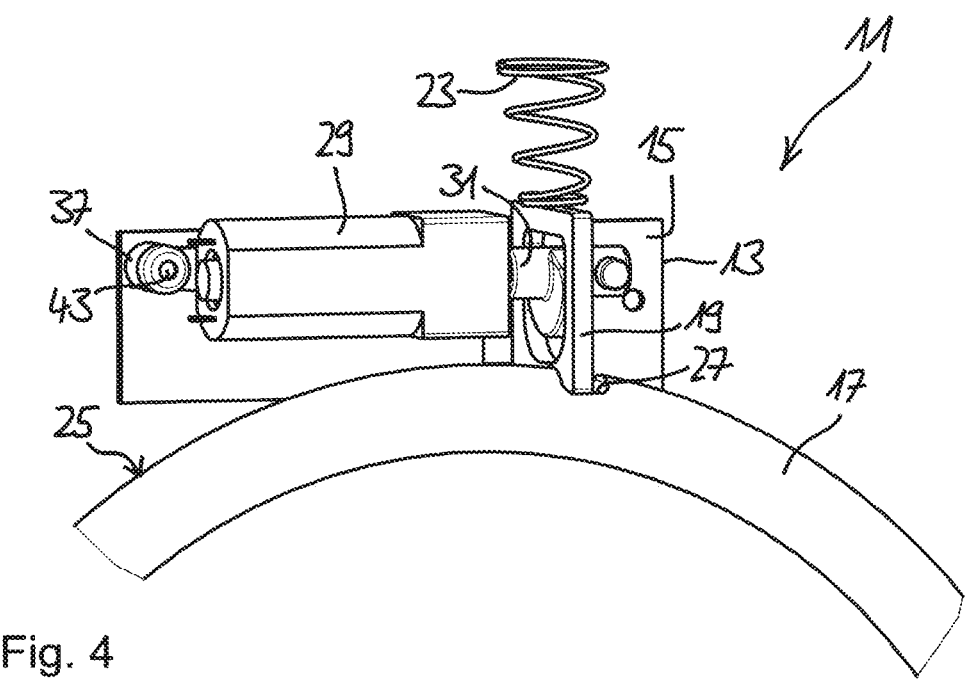
Figure 5:
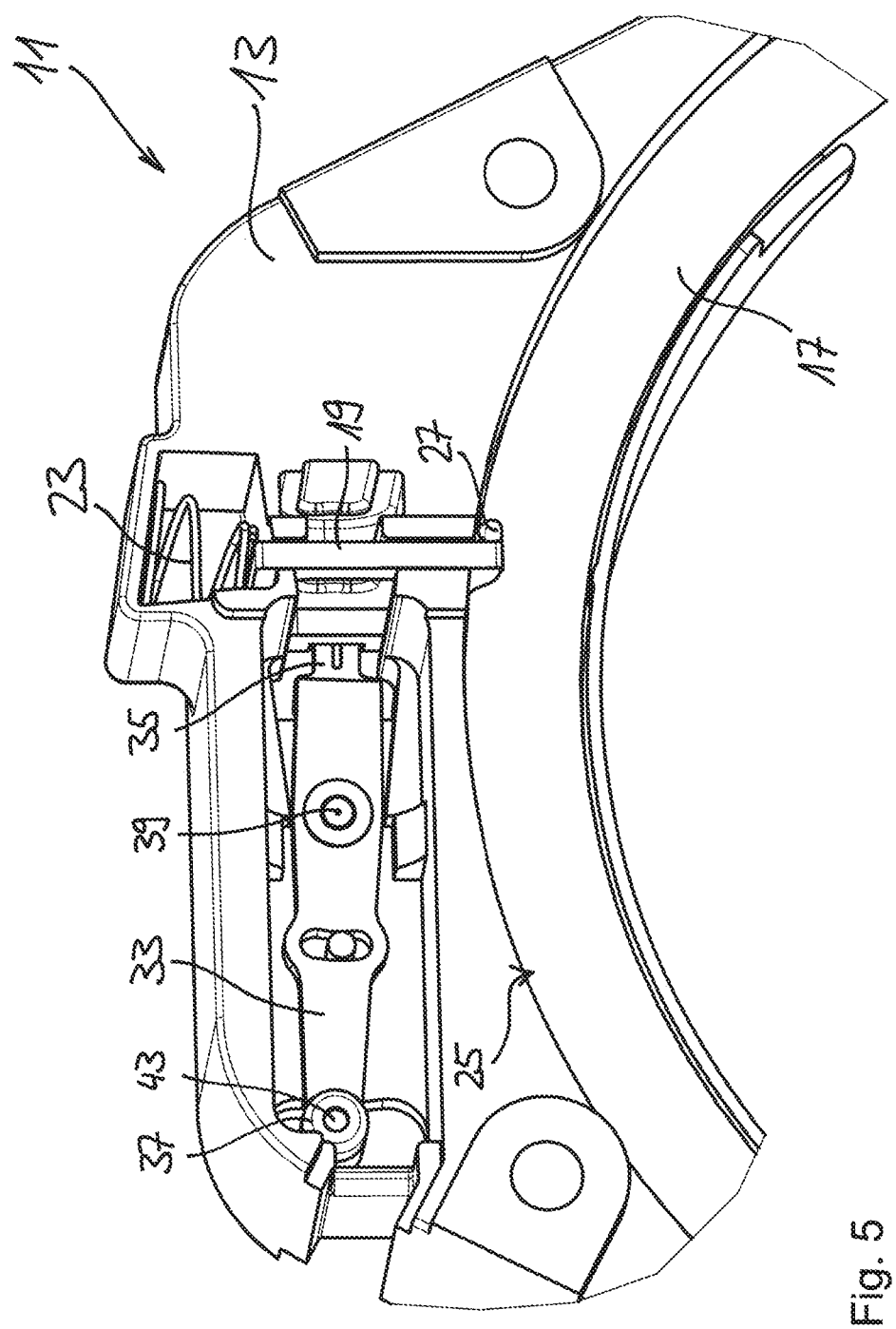

FIG. 3 largely corresponds to FIG. 2, but with the hoop adopting an intermediate position and the latch being in the unlocked position;

FIG. 4 largely corresponds to FIG. 2, but with the hoop being in the open position and the latch being in a securing position; and FIG. 5 shows the same embodiment as in FIGS. 1 to 4 in a perspective schematic detail representation, with in part different parts of the lock being shown than in FIGS. 1 to 4.

DETAILED DESCRIPTION

FIGS. 1 to 5 show an embodiment of a lock in accordance with the invention. It is a partly automatic frame lock 11 that is in particular intended for two-wheelers in this embodiment. The frame lock 11 comprises a lock body 13 of which only a plate 15 bounding an inner space of the lock body 13 is shown in FIGS. 1 to 4; in FIG. 5, however, details of further elements are shown.

Figure 1:
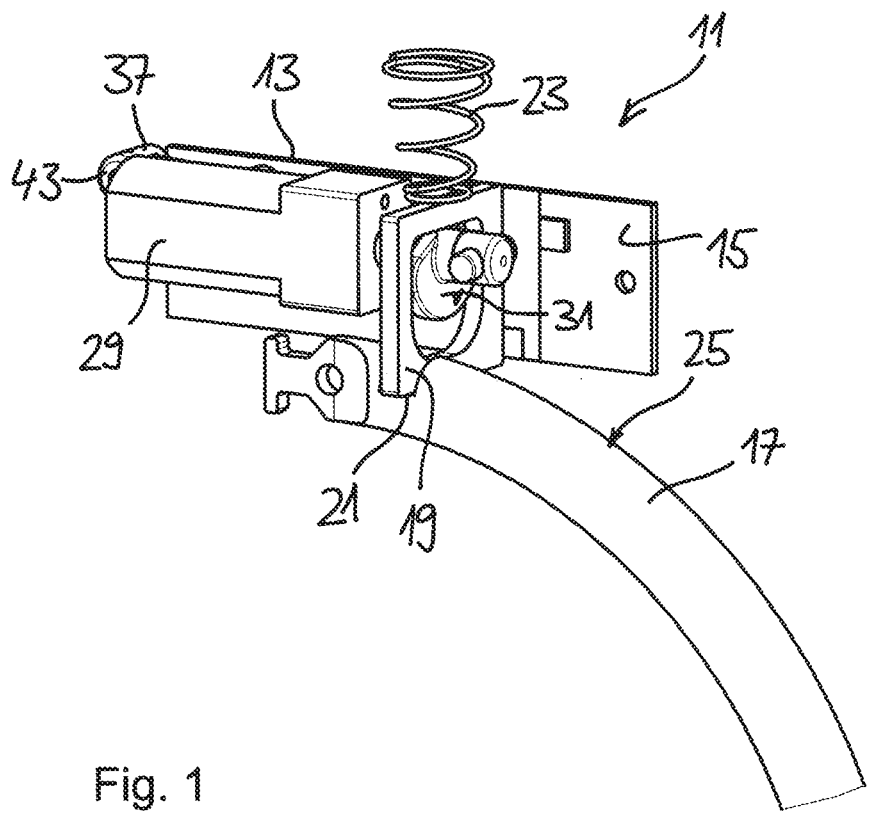
FIG. 1 shows in a perspective schematic representation parts of an embodiment of the lock in accordance with the invention, with the hoop being in the closed position and the latch being in the locked position.

The frame lock 11 further comprises a hoop 17 that is the shape of a partial arc and that is respectively only partly shown and that is movable between the closed position shown in FIGS. 1 and 2 and the open position shown in FIGS. 4 and 5. In the state of the lock shown in FIG. 3, the hoop 17 is in an intermediate position between the closed position and the open position. The hoop 17 is guided by the lock body 13 on a circular path along which the shape of a partial arc of the hoop 17 also extends. The frame lock 11 is configured to be arranged at a wheel of a two-wheeler such that the hoop 17 engages between the spokes of the wheel in the closed position and thereby blocks it; in contrast it releases the wheel in the open position. The hoop 17 can here be preloaded into the open position.

The general movability of the hoop 17 is restricted by a latch 19 of the lock 11 that is substantially movably supported radially with respect to the shape of a partial arc of the hoop 17 at the lock body 13. The latch 19, when the hoop 17 is in its locked position, can here engage into a first engagement recess 21 of the hoop 17 that extends radially from the outside into the hoop 17. In this state, that is shown in FIGS. 1 and 2, the latch 19 blocks the hoop 17 against a departure from the closed position by the engagement into the first engagement recess 21 and is to this extent in its locked position.

The latch 19 can be radially outwardly displaced from this locked position so that it moves out of the first engagement recess 21 and is arranged radially outside the outer radius of the hoop 17. The hoop 17 is thereby released for a departure from the closed position so that the latch 19 to this extent is in its unlocked position. The unlocked position is here not necessarily restricted to a single position of the latch 19, but can rather comprise the total range of latch positions in which the hoop 17 is released for a movement from the closed position into the open position and back. The unlocked position of the latch 19 is shown, for example, in FIG. 3.

The lock furthermore comprises a spring 23 that acts on the latch 19 and thereby preloads it against the hoop 17. As long as the latch 19 is not moved or held against this preload, the latch 19 therefore contacts an outer contour 25 of the hoop 17. Where the latch 19 respectively contacts along this contour 25 here depends on the respective position of the hoop 17. The first engagement recess 21 here forms that part of the contour 25 which the latch 19 contacts in the closed position of the hoop 17. In a region that adjoins the first engagement recess 21, the contour 25 has a substantially constant radius that corresponds to the outer radius of the hoop 17. The latch 19 contacts this region at intermediate positions of the hoop 17 between its closed position and its open position due to the preload and thereby substantially adopts the unlocked position shown in FIG. 3. In the unlocked position of the latch 19, the hoop 17 can be opened or closed, with the latch 19 sliding along the contour 25 of the hoop as long as it is not held at a spacing from the contour 25 as shown in FIG. 3 by the eccentric mechanism 31 against the preload of the spring 23.

The contour 25 extends from the first engagement recess 21 over the region having a constant radius up to a second engagement recess 27 that extends radially from outside into the hoop 17 and into which the latch 19 engages due to the preload of the spring 23 when the hoop 17 is in the open position. The second engagement recess 27 has a smaller depth than the first engagement recess 21 with respect to the region of the contour 25 having a constant radius. The position of the latch 19 engaging into the second engagement recess 27 shown in FIGS. 4 and 5 thereby differs from the locked position in which it is located when it engages into the first engagement recess 21. The hoop 17 is prevented from a departure from its open position by the engagement of the latch 19 into the second engagement recess 27 so that the hoop 17 is secured against closing. The latch position shown in FIGS. 4 and 5 to this extent represents a securing position of the latch 19 to be distinguished from the locked position and the unlocked position.

The latch 19 can be displaced radially outwardly in a motorized manner with respect to the shape of a partial arc of the hoop 17 against the preload of the spring 23. A drive motor 29 is provided for this purpose that is configured as an electric motor in the embodiment shown by way of example. An output shaft of the drive motor 29 drives an eccentric mechanism 31 that engages into an opening of the substantially disk-shaped latch 19 so that the latch 19 can be radially outwardly displaced against the preload in dependence on the rotational position of the eccentric mechanism 31 and can generally also be held in a specific position. The drive motor 29 is, however, only used to release the hoop 17 for a departure from the closed position (FIGS. 1 and 2) or from the open position (FIGS. 4 and 5) in that the latch 19 is briefly radially outwardly displaced from its locked position (FIGS. 1 and 2) or from its securing position (FIGS. 4 and 5) so that the engagement of the latch 19 into the first engagement recess 21 or into the second engagement recess 27 is canceled. As soon as the hoop 17 has thereupon moved out of the closed position or the open position, the drive motor 29 can be deactivated so that the latch 19 is again urged against the hoop 17 by the preload of the spring 23 and contacts the region of the contour 25 having a constant radius. The hoop 17 is thereby released for a movement between its closed position and its open position.

Since the latch 19 contacts the contour 25 as a result of the preload as long as it is not temporarily displaced or held against the preload, the state of the hoop 17 can also be determined with reference to the respective position of the latch 19. If the latch 19 is in the locked position, the hoop 17 can only be in the closed position. In a corresponding manner, the hoop 17 can only be in the open position when the latch 19 is in the securing position. If the latch 19 is, in contrast, in the unlocked position, in particular in the position in which it contacts the contour 25 having a constant radius, the hoop 17 is in an intermediate position between the open position and the closed position. The requirement for the information to be able to be detected is, however, that the locked position, the securing position, and the unlocked position can be reliably distinguished even though the stroke of the latch 19 that is in particular defined by the spacing of the locked position shown in FIGS. 1 and 2 from the unlocked position shown in FIG. 3 is very small under certain circumstances, in the present example only amounts to approximately 4 mm.

For a nevertheless reliable detection of the latch position, a lever 33 is provided within the lock body 13 that is arranged substantially in parallel with the drive motor 29 and is largely hidden by the drive motor 29 in FIGS. 1 to 4. In FIG. 5, in contrast, the lever 33 can be seen almost completely since the drive motor 29 and the eccentric mechanism 31 are removed in FIG. 5. The lever 33 is configured as a flat, straight bar that extends from a coupling section 35 up to a deflection section 37. The lever 33 is here pivotably supported about a pivot point 39 at the lock body 13. The latch 19 is here arranged movably substantially tangential to the pivot axis of the lever 33 defined by the pivot point 39. The lever 33 is movement-coupled to the latch 19 via the coupling section 35 so that the lever 33 is pivoted about the pivot point 39 on a displacement of the latch 19. The movement coupling of the lever 33 with the latch 19 in this respect takes place in that the coupling section 35 engages into a cutout of the latch 19.

Since the coupling section 35 is provided at a first end of the lever 33 and the deflection section 37 is provided at a second end of the lever 33 opposite the first ends at a spacing from the pivot point 39 that is approximately twice as large as the coupling section 35, on a movement of the coupling section 35, the deflection section 37 executes a movement that is approximately twice as large in comparison therewith. In this manner, the three positions of the deflection section 37 corresponding to the locked position, to the unlocked position, and to the securing position of the latch 19 differ more from one another than these latch positions themselves. The latch positions can therefore be more reliably distinguished by means of a sensor 41 (cf. FIGS. 3 and 3) that is arranged adjacent to the deflection section 37 of the lever 33 and that detects the position of the deflection section 37 than if they were directly detected with reference to the latch 19. In addition, the sensor 41 can in this manner be arranged outside the contamination region of the latch 19 and can instead also be arranged in the proximity of electronics (not shown) inter alia provided to control the drive motor 29.

The sensor 41 is a magnetic sensor in the manner of a Hall sensor or of a magnetic field sensor that is in particular configured for a three-dimensional magnetic detection. The sensor 41 here cooperates with a permanent magnet 43 that is arranged at the deflection section 37 of the lever 33 and whose magnetic field the sensor 41 detects. The configuration of the sensor 41 as a 3D sensor makes it possible here to reliably distinguish by means of a single sensor 41 at least the three positions of the deflection section 37 of the lever 33 that correspond to the locked position, to the unlocked position, and to the securing position on the basis of the movement coupling of the latch 19 to the coupling section 35 of the lever 33.

REFERENCE NUMERALS

11 frame lock
13 lock body
15 plate
17 hoop
19 latch
21 first engagement recess
23 spring
25 contour
27 second engagement recess
29 drive motor
31 eccentric mechanism
33 lever
35 coupling section
37 deflection section
39 pivot point
41 sensor
43 permanent magnet

What is claimed is:

1. A lock (11) comprising
a lock body (13);
a hoop (17) that is movable between an open position and a closed position;
a latch (19) that is movably supported at the lock body (13) between a locked position in which it blocks the hoop (17), while the hoop (17) is in the closed position, against a departure from the closed position, and an unlocked position in which it releases the hoop (17); and
a sensor (41) for detecting the latch position;
wherein the lock further comprises a movably supported lever (33), with a coupling section (35) of the lever (33) being movement-coupled to the latch (19);
with the lever (33) being supported such that on a movement of the coupling section (35), a deflection section (37) of the lever (33) spaced apart from the coupling section (35) carries out a movement that is larger than the movement of the coupling section (35);
and with the sensor (41) detecting the position of the deflection section (37) of the lever (33) to detect the latch position;
wherein the deflection section (37) magnetically cooperates with the sensor (41);
wherein the deflection section (37) has a permanent magnet (43) and the sensor (41) is configured as a magnetic sensor.

2. A lock in accordance with claim 1, wherein the lever (33) is pivotably supported about a pivot point (39).

3. A lock in accordance with claim 2, wherein the pivot point (39) is provided between the coupling section (35) and the deflection section (37).

4. A lock in accordance with claim 1, wherein the coupling section (35) is provided at a first end of the lever (33) and the deflection section (37) is provided at a second end of the lever (33) opposite the first end.

5. A lock in accordance with claim 1, wherein the hoop (17) is at least partly arranged within the lock body (13) and wherein the latch (19) and the lever (33) are arranged completely within the lock body (13).

6. A lock in accordance with claim 1, wherein the sensor (41) is configured as a Hall sensor or as a magnetic field sensor; and/or wherein the sensor (41) is configured for a three-dimensional magnetic detection.

7. A lock in accordance with claim 1, wherein the lock comprises an inner housing that is arranged within the lock body (13), with the sensor (41) being arranged within the inner housing and the lever (33) being arranged outside the inner housing.

8. A lock in accordance with claim 7, wherein the inner housing is closed fully around its periphery.

9. A lock in accordance with claim 1, wherein the lever (33) is supported such that it has a single degree of freedom.

10. A lock in accordance with claim 1, wherein the lock comprises a drive motor (29) for moving the latch (19).

11. A lock in accordance with claim 10, wherein the lever (33) is aligned substantially in parallel with the drive motor (29).

12. A lock in accordance with claim 1, wherein the hoop (17) has a first engagement recess (21) into which the latch (19) can engage when the hoop (17) is in the closed position to block the hoop (17) against a departure from the closed position.

13. A lock in accordance with claim 12, wherein the hoop (17) has a second engagement recess (27) into which the latch (19) can engage when the hoop (17) is in the open position to block the hoop (17) against a departure from the open position.

14. A lock in accordance with claim 1, wherein the latch (19) is preloaded against the hoop (17) so that it contacts a contour (25) of the hoop (17);
and wherein the contour (25) of the hoop (17) is configured such that, as a consequence of the preload, the latch (19)
adopts its locked position in the closed position of the hoop (17);
adopts its unlocked position in positions of the hoop (17) that are between the closed position and the open position of the hoop (17); and
adopts a securing position that differs from the locked position and from the unlocked position in the open position of the hoop (17).

15. A lock in accordance with claim 14, wherein the securing position of the latch (19) lies between the locked position and the unlocked position.

16. A lock in accordance with claim 1, wherein the hoop (17) has a first engagement recess (21) into which the latch (19) can engage when the hoop (17) is in the closed position to block the hoop (17) against a departure from the closed position; wherein the hoop (17) has a second engagement recess (27) into which the latch (19) can engage when the hoop (17) is in the open position to block the hoop (17) against a departure from the open position;
wherein the latch (19) is preloaded against the hoop (17) so that it contacts a contour (25) of the hoop (17), wherein the contour (25) of the hoop (17) is configured such that, as a consequence of the preload, the latch (19)
adopts its locked position in the closed position of the hoop (17);
adopts its unlocked position in positions of the hoop (17) that are between the closed position and the open position of the hoop (17); and
adopts a securing position that differs from the locked position and from the unlocked position in the open position of the hoop (17);
wherein the contour (25) of the hoop (17) has the first engagement recess (21) and the second engagement recess (27) so that, as a consequence of the preload, the latch (19)
engages into the first engagement recess (21) in the closed position of the hoop (17), with the locked position of the latch (19) being defined by the depth of the engagement; and
engages into the second engagement recess (27) in the open position of the hoop (17), with the securing position of the latch (19) being defined by the depth of the engagement.

17. A lock in accordance with claim 1, wherein the lock (11) is configured to selectively block a wheel of a two-wheeled vehicle.

18. A lock (11) comprising
a lock body (13);
a hoop (17) that is movable between an open position and a closed position;
a latch (19) that is movably supported at the lock body (13) between a locked position in which it blocks the hoop (17), while the hoop (17) is in the closed position, against a departure from the closed position, and an unlocked position in which it releases the hoop (17); and
a sensor (41) for detecting the latch position;
wherein the lock further comprises a movably supported lever (33), with a coupling section (35) of the lever (33) being movement-coupled to the latch (19);
with the lever (33) being supported such that on a movement of the coupling section (35), a deflection section (37) of the lever (33) spaced apart from the coupling section (35) carries out a movement that is larger than the movement of the coupling section (35);
and with the sensor (41) detecting the position of the deflection section (37) of the lever (33) to detect the latch position;
wherein the deflection section (37) magnetically cooperates with the sensor (41);
wherein the lock comprises an inner housing that is arranged within the lock body (13), with the sensor (41) being arranged within the inner housing and the lever (33) being arranged outside the inner housing.

19. The lock in accordance with claim 18, wherein the sensor (41) is configured as a Hall sensor or as a magnetic field sensor; and/or wherein the sensor (41) is configured for a three-dimensional magnetic detection.

20. A lock (11) comprising
a lock body (13);
a hoop (17) that is movable between an open position and a closed position;
a latch (19) that is movably supported at the lock body (13) between a locked position in which it blocks the hoop (17), while the hoop (17) is in the closed position, against a departure from the closed position, and an unlocked position in which it releases the hoop (17); and
a sensor (41) for detecting the latch position;
wherein the lock further comprises a movably supported lever (33), with a coupling section (35) of the lever (33) being movement-coupled to the latch (19);
with the lever (33) being supported such that on a movement of the coupling section (35), a deflection section (37) of the lever (33) spaced apart from the coupling section (35) carries out a movement that is larger than the movement of the coupling section (35);
and with the sensor (41) detecting the position of the deflection section (37) of the lever (33) to detect the latch position;
wherein the lock comprises a drive motor (29) for moving the latch (19);
wherein the lever (33) is aligned substantially in parallel with the drive motor (29).

21. A lock in accordance with claim 20, wherein the lock comprises an inner housing that is arranged within the lock body (13), with the sensor (41) being arranged within the inner housing and the lever (33) being arranged outside the inner housing, and wherein the inner housing is closed fully around its periphery.

\* \* \* \* \*